(12) United States Patent
Klingenberg et al.

(10) Patent No.: US 10,032,115 B2
(45) Date of Patent: Jul. 24, 2018

(54) ESTIMATING FILE LEVEL INPUT/OUTPUT OPERATIONS PER SECOND (IOPS)

(71) Applicant: International Business Machines Corporation, Armonk, NY (US)

(72) Inventors: Bernhard J. Klingenberg, Grover Beach, CA (US); Sunhwan Lee, Menlo Park, CA (US); Mu Qiao, Belmont, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/145,560

(22) Filed: May 3, 2016

(65) Prior Publication Data
US 2017/0322725 A1 Nov. 9, 2017

(51) Int. Cl.
G06F 12/00 (2006.01)
G06F 13/00 (2006.01)
G06F 13/28 (2006.01)
G06N 7/00 (2006.01)
G06F 11/34 (2006.01)

(52) U.S. Cl.
CPC ......... *G06N 7/005* (2013.01); *G06F 11/3466* (2013.01)

(58) Field of Classification Search
CPC ...... G06F 3/061; G06F 3/0643; G06F 3/0665; G06F 3/0689; G06F 11/3466; G06N 7/005
USPC .......................................................... 711/114
See application file for complete search history.

(56) References Cited

U.S. PATENT DOCUMENTS

| | | | | |
|---|---|---|---|---|
| 5,475,844 A * | 12/1995 | Shiramizu | ............... | G06F 9/505 713/1 |
| 5,671,445 A * | 9/1997 | Gluyas | .................. | G06F 3/1295 710/100 |
| 8,112,586 B1 * | 2/2012 | Reiner | ................ | G06F 12/0897 711/119 |
| 8,782,341 B1 * | 7/2014 | Niranjan | ............. | G06F 11/1076 711/114 |

(Continued)

OTHER PUBLICATIONS

Settu, R. & Raj, P., "Cloud Application Modernization and Migration Methodology," Cloud Computing, 2013, pp. 243-271.

(Continued)

*Primary Examiner* — Sheng-Jen Tsai
(74) *Attorney, Agent, or Firm* — Zilka-Kotab, P.C.

(57) ABSTRACT

A computer-implemented method according to one embodiment includes identifying a storage volume comprising a plurality of files, calculating a file level input/output operations per second (IOPS) value for each of a subset of the plurality of files within the storage volume, creating a predictive model for the storage volume, using metadata determined for the subset of the plurality of files and the IOPS values calculated for each of the subset of the plurality of files within the storage volume, estimating file level IOPS values for each of the plurality of files in the storage volume, utilizing the predictive model, combining the estimated and calculated file level IOPS values and comparing the combined values to a calculated volume level IOPS value for the storage volume, conditionally adjusting one or more of the estimated file level IOPS values, based on the comparing, and returning the estimated file level IOPS values.

20 Claims, 6 Drawing Sheets

(56) References Cited

U.S. PATENT DOCUMENTS

| | | | | |
|---|---|---|---|---|
| 8,924,328 | B1* | 12/2014 | Kozlovsky | H04L 41/0816 703/2 |
| 8,953,265 | B1* | 2/2015 | Ma | G11B 27/36 360/31 |
| 2002/0069334 | A1* | 6/2002 | Hsia | G06F 3/0611 711/147 |
| 2005/0267929 | A1* | 12/2005 | Kitamura | G06F 3/061 709/201 |
| 2005/0267950 | A1* | 12/2005 | Kitamura | G06F 3/061 709/219 |
| 2007/0113036 | A1* | 5/2007 | Gal-Oz | G06F 3/0608 711/165 |
| 2008/0027905 | A1* | 1/2008 | Jensen | G06F 3/0613 |
| 2009/0144545 | A1* | 6/2009 | Dhuvur | G06F 21/552 713/165 |
| 2009/0235042 | A1* | 9/2009 | Petrocelli | G06F 1/3203 711/170 |
| 2010/0082300 | A1* | 4/2010 | Hollingsworth | G06F 3/0605 702/186 |
| 2010/0250746 | A1 | 9/2010 | Murase | |
| 2013/0042004 | A1 | 2/2013 | Boss et al. | |
| 2013/0085998 | A1* | 4/2013 | Barker | G06F 9/5088 707/649 |
| 2013/0117336 | A1* | 5/2013 | Wang | G06F 3/0607 707/822 |
| 2014/0181585 | A1* | 6/2014 | Hoang | G06F 11/3034 714/26 |
| 2014/0181595 | A1* | 6/2014 | Hoang | G06F 11/3034 714/47.3 |
| 2015/0169621 | A1* | 6/2015 | Ouyang | G06F 17/302 707/827 |
| 2015/0263978 | A1* | 9/2015 | Olson | G06F 9/505 709/226 |
| 2015/0363396 | A1* | 12/2015 | Sengupta | G06F 17/303 707/609 |
| 2016/0041787 | A1* | 2/2016 | Nicolae | G06F 3/0631 710/74 |
| 2016/0041829 | A1* | 2/2016 | Singh | G06F 11/34 713/2 |
| 2016/0062795 | A1* | 3/2016 | Hu | H04L 47/783 718/104 |
| 2016/0267020 | A1* | 9/2016 | Wang | G06F 12/123 |
| 2017/0031671 | A1* | 2/2017 | Joshi | G06F 8/65 |
| 2017/0118282 | A1* | 4/2017 | Lee | H04L 67/1097 |
| 2017/0123731 | A1* | 5/2017 | Kashiwagi | G06F 3/0659 |

OTHER PUBLICATIONS

Anonymous, "Data-Centric Predictive Cloud Migration Based on User Modelling," IP.com, Aug. 20, 2014, pp. 1-4.

* cited by examiner

ESTIMATING FILE LEVEL INPUT/OUTPUT OPERATIONS PER SECOND (IOPS)

BACKGROUND

The present invention relates to data analysis, and more specifically, this invention relates to determining data storage performance.

Many options currently exist for storing data, each with its own benefits and detriments. When determining a storage solution for data, it is important to know factors associated with the storage of such data, such as the number of input/output operations per second (IOPS). However, current techniques for calculating file level TOPS are very resource intensive.

SUMMARY

A computer-implemented method according to one embodiment includes identifying a storage volume comprising a plurality of files, calculating a file level input/output operations per second (IOPS) value for each of a subset of the plurality of files within the storage volume, creating a predictive model for the storage volume, using metadata determined for the subset of the plurality of files and the IOPS values calculated for each of the subset of the plurality of files within the storage volume, estimating file level TOPS values for each of the plurality of files in the storage volume, utilizing the predictive model, combining the estimated and calculated file level IOPS values and comparing the combined values to a calculated volume level IOPS value for the storage volume, conditionally adjusting one or more of the estimated file level TOPS values, based on the comparing, and returning the estimated file level IOPS values.

According to another embodiment, a computer program product for predicting future sales data comprises a computer readable storage medium having program instructions embodied therewith, wherein the computer readable storage medium is not a transitory signal per se, and where the program instructions are executable by a processor to cause the processor to perform a method comprising identifying, utilizing the processor, a storage volume comprising a plurality of files, calculating, utilizing the processor, a file level input/output operations per second (IOPS) value for each of a subset of the plurality of files within the storage volume, creating, utilizing the processor, a predictive model for the storage volume, using metadata determined for the subset of the plurality of files and the IOPS values calculated for each of the subset of the plurality of files within the storage volume, estimating, utilizing the processor, file level IOPS values for each of the plurality of files in the storage volume, utilizing the predictive model, combining, utilizing the processor, the estimated and calculated file level IOPS values and comparing the combined values to a calculated volume level IOPS value for the storage volume, conditionally adjusting, utilizing the processor, one or more of the estimated file level IOPS values, based on the comparing, and returning, utilizing the processor, the estimated file level IOPS values.

A system according to another embodiment includes a processor and logic integrated with and/or executable by the processor, the logic being configured to identify a storage volume comprising a plurality of files, calculate a file level input/output operations per second (IOPS) value for each of a subset of the plurality of files within the storage volume, create a predictive model for the storage volume, using metadata determined for the subset of the plurality of files and the IOPS values calculated for each of the subset of the plurality of files within the storage volume, estimate file level IOPS values for each of the plurality of files in the storage volume, utilizing the predictive model, combine the estimated and calculated file level IOPS values and comparing the combined values to a calculated volume level IOPS value for the storage volume, conditionally adjust one or more of the estimated file level IOPS values, based on the comparing, and return the estimated file level IOPS values.

Other aspects and embodiments of the present invention will become apparent from the following detailed description, which, when taken in conjunction with the drawings, illustrate by way of example the principles of the invention.

DETAILED DESCRIPTION

Figure 1:
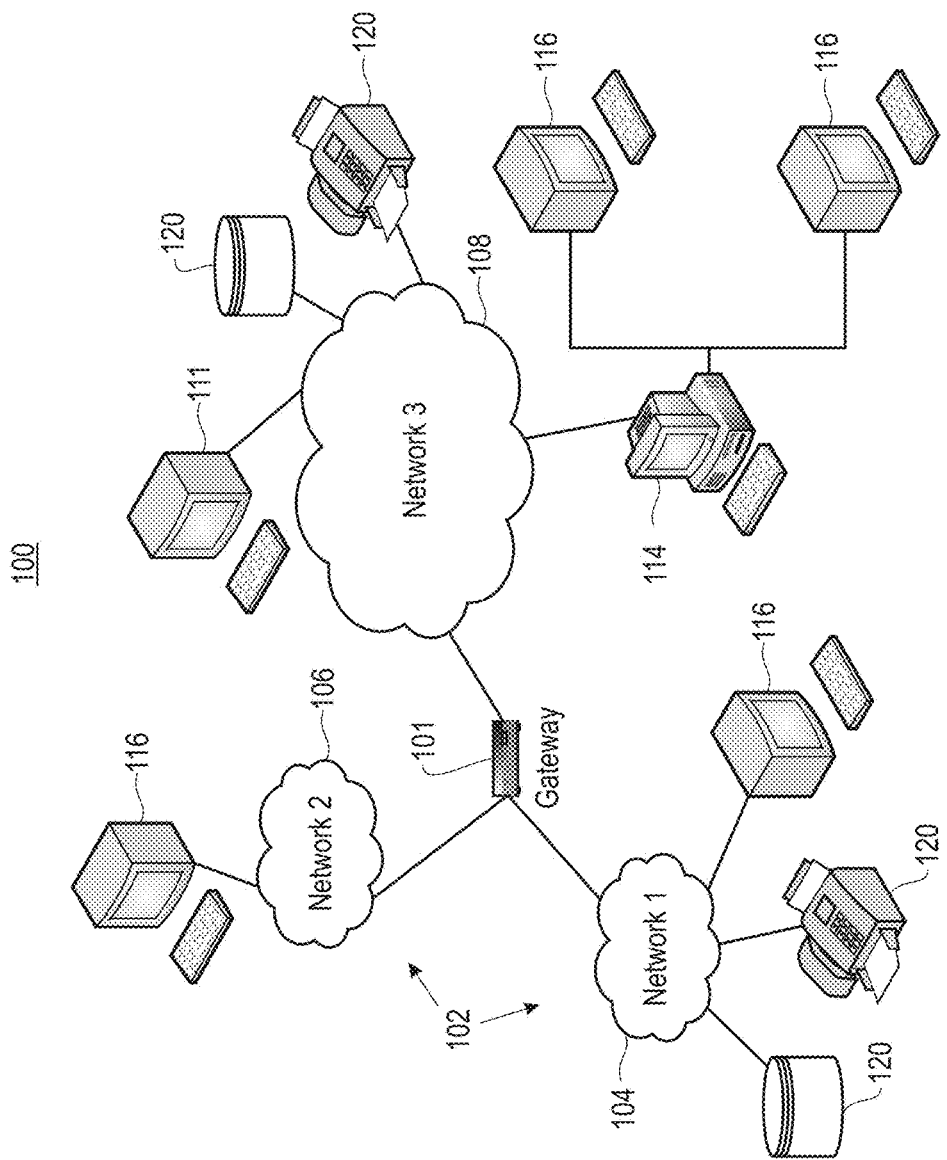
FIG. 1 illustrates a network architecture, in accordance with one embodiment.

The following description discloses several preferred embodiments of systems, methods and computer program products for estimating file level input/output operations per second (IOPS). Various embodiments provide a method to create and utilize a predictive model to estimate file level IOPS.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for estimating file level input/output operations per second (IOPS).

In one general embodiment, a computer-implemented method includes identifying a storage volume comprising a plurality of files, calculating a file level input/output operations per second (IOPS) value for each of a subset of the plurality of files within the storage volume, creating a predictive model for the storage volume, using metadata determined for the subset of the plurality of files and the IOPS values calculated for each of the subset of the plurality of files within the storage volume, estimating file level IOPS values for each of the plurality of files in the storage volume, utilizing the predictive model, combining the estimated and calculated file level IOPS values and comparing the combined values to a calculated volume level IOPS value for the storage volume, conditionally adjusting one or more of the estimated file level IOPS values, based on the comparing, and returning the estimated file level IOPS values.

In another general embodiment, a computer program product for predicting future sales data comprises a computer readable storage medium having program instructions embodied therewith, wherein the computer readable storage medium is not a transitory signal per se, and where the program instructions are executable by a processor to cause the processor to perform a method comprising identifying, utilizing the processor, a storage volume comprising a plurality of files, calculating, utilizing the processor, a file level input/output operations per second (IOPS) value for each of a subset of the plurality of files within the storage volume, creating, utilizing the processor, a predictive model for the storage volume, using metadata determined for the subset of the plurality of files and the IOPS values calculated for each of the subset of the plurality of files within the storage volume, estimating, utilizing the processor, file level IOPS values for each of the plurality of files in the storage volume, utilizing the predictive model, combining, utilizing the processor, the estimated and calculated file level IOPS values and comparing the combined values to a calculated volume level IOPS value for the storage volume, conditionally adjusting, utilizing the processor, one or more of the estimated file level IOPS values, based on the comparing, and returning, utilizing the processor, the estimated file level IOPS values.

In another general embodiment, a system includes a processor and logic integrated with and/or executable by the processor, the logic being configured to identify a storage volume comprising a plurality of files, calculate a file level input/output operations per second (IOPS) value for each of a subset of the plurality of files within the storage volume, create a predictive model for the storage volume, using metadata determined for the subset of the plurality of files and the IOPS values calculated for each of the subset of the plurality of files within the storage volume, estimate file level IOPS values for each of the plurality of files in the storage volume, utilizing the predictive model, combine the estimated and calculated file level IOPS values and comparing the combined values to a calculated volume level IOPS value for the storage volume, conditionally adjust one or more of the estimated file level IOPS values, based on the comparing, and return the estimated file level IOPS values.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
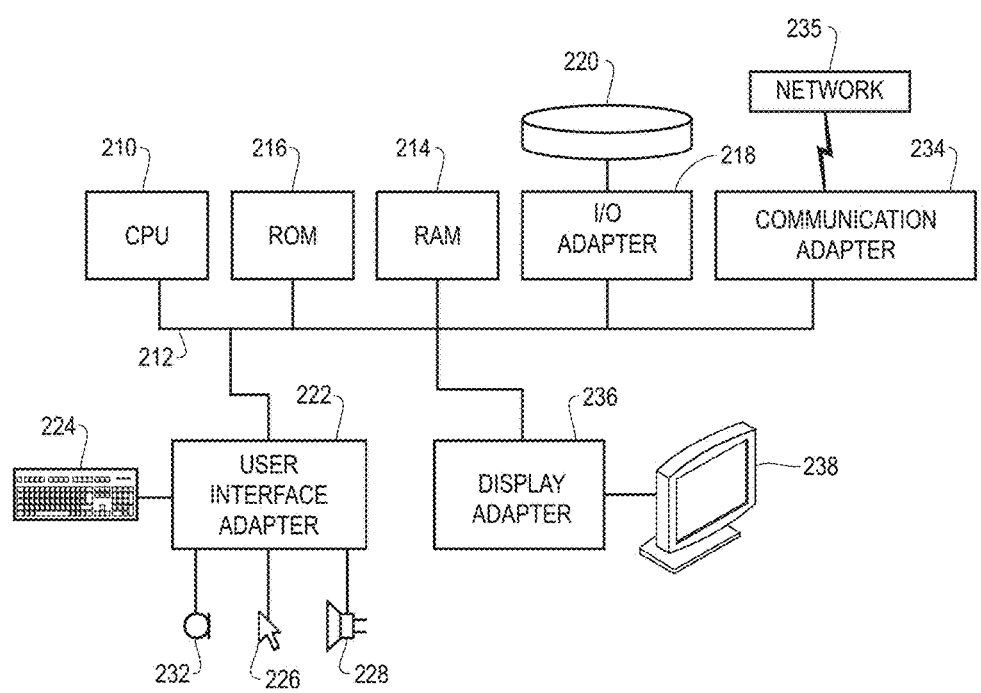
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
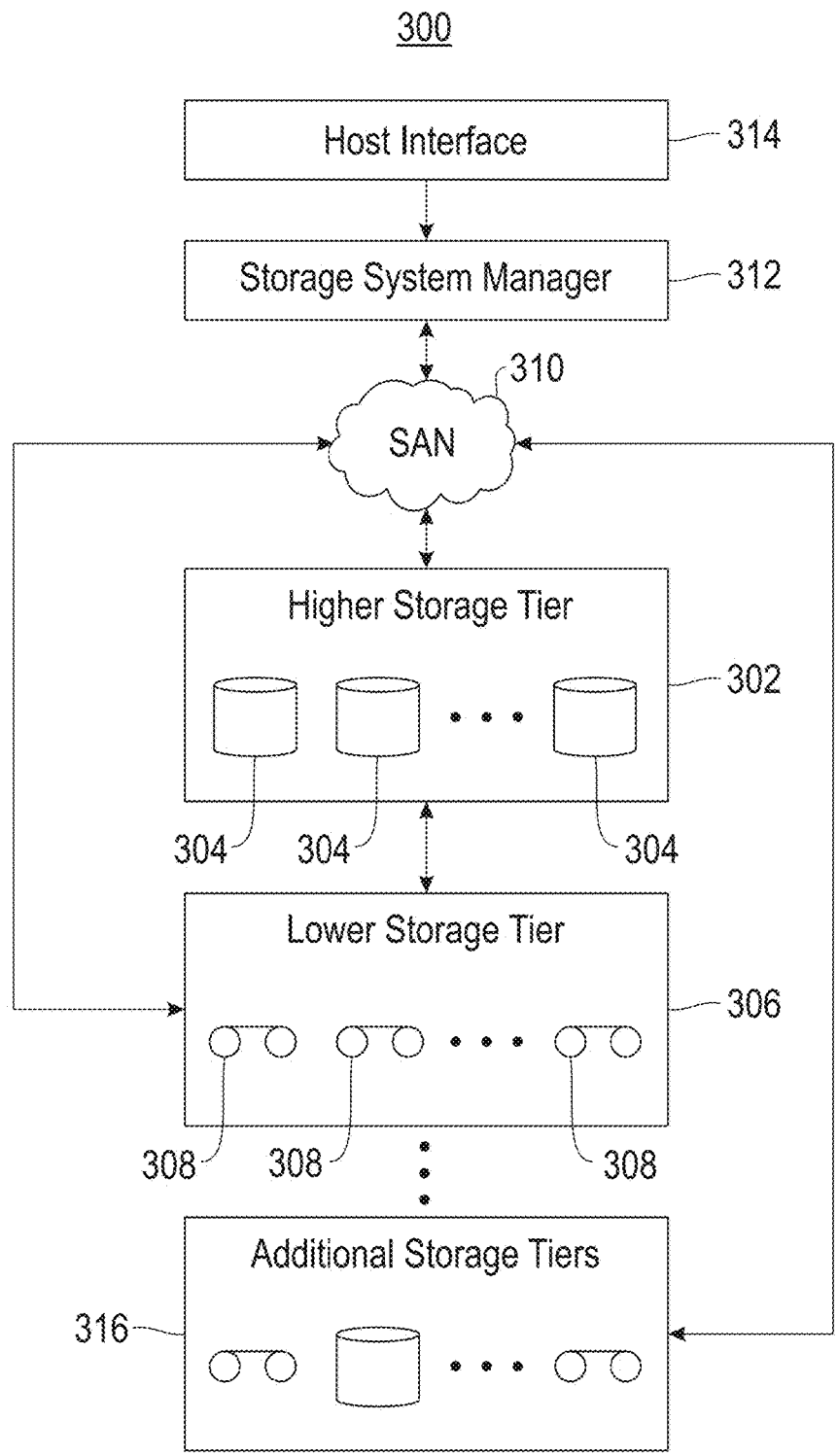
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
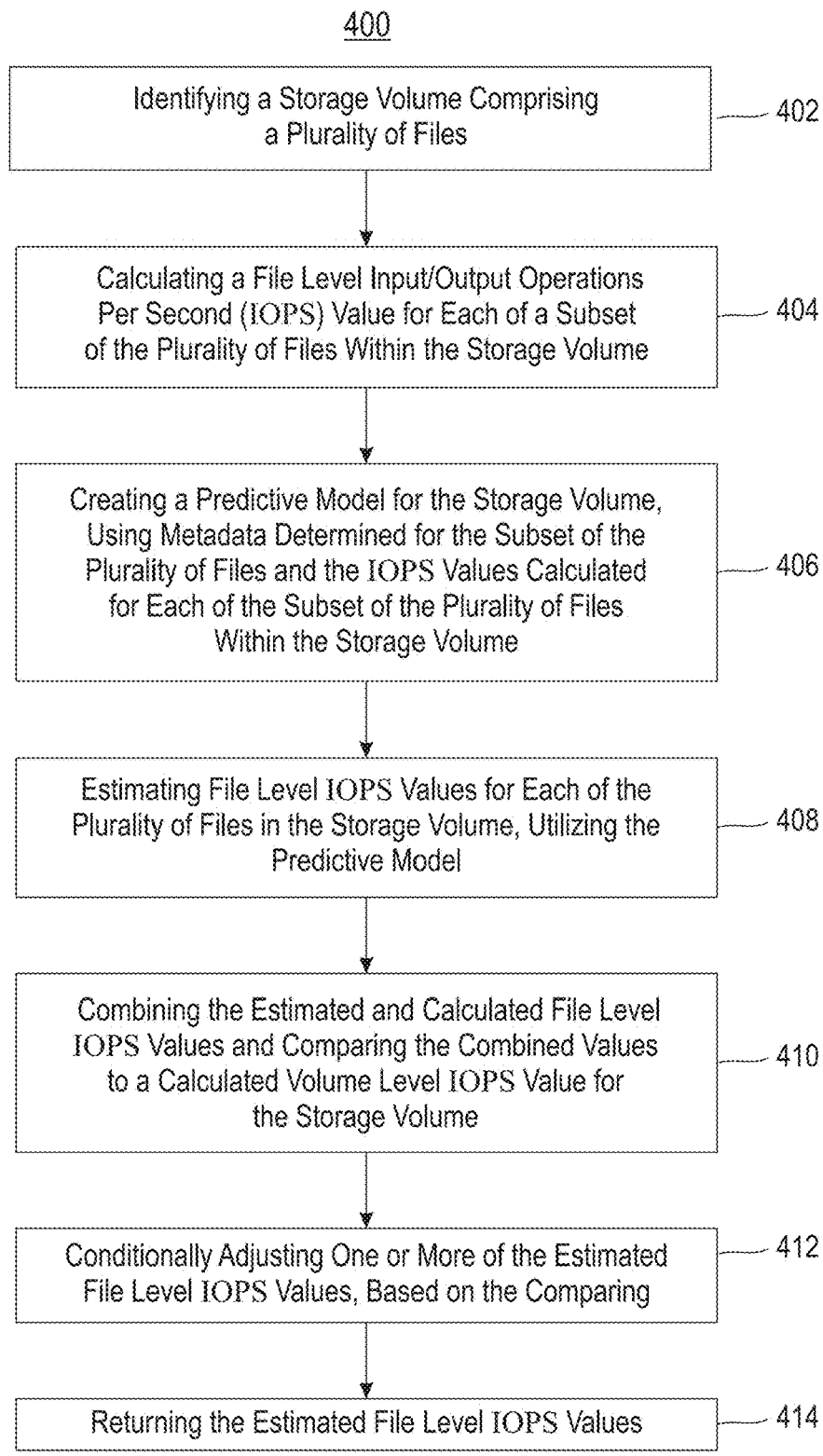
FIG. 4 illustrates a method for estimating file level input/output operations per second (IOPS), in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a storage volume comprising a plurality of files is identified. In one embodiment, the storage volume may include a predetermined block of storage. In another embodiment, the storage volume may be located within a storage device. For example, the storage volume may be located within one or more databases, one or more servers, one or more hard disk drives, one or more mobile computing devices, one or more networked computing devices, one or more mobile computing devices, etc. In another embodiment, the storage volume may be identified in response to a request to migrate the data within the storage volume. For example, the storage volume may be identified in response to a request to migrate the data within the storage volume to cloud storage.

Additionally, in one embodiment, the plurality of files may include any data able to be stored in a storage volume. For example, each of the plurality of files may include image files, application files, data files, document files, etc.

Further, as shown in FIG. 4, method 400 may proceed with operation 404, where a file level input/output operations per second (IOPS) value is calculated for each of a subset of the plurality of files within the storage volume. In one embodiment, the subset of the plurality of files may be determined arbitrarily. For example, a random sampling of the plurality of files may constitute the subset of the plurality of files. In another embodiment, one or more predetermined files within the storage volume may be selected as the subset of the plurality of files. For example, one or more files located at predetermined locations within the storage volume may be selected to be part of the subset.

Further still, in one embodiment, a predetermined portion of the storage volume may be selected to be included within the subset of the plurality of files. For example, a predetermined percentage of the number of total files within the storage volume may be determined, and that percentage may dictate a size of the subset of the plurality of files (e.g., by indicating a total file size within the subset, a total number of files within the subset, etc.). In another embodiment, one or more algorithms may be used to determine the plurality of files of be included in the subset.

Also, in one embodiment, the file level IOPS value calculated for each of the subset of the plurality of files may include an indication of input and output performance associated with each individual file. For example, the file level IOPS for a file may be determined for the specific file itself. For instance, the file level IOPS for a file may include an input/output performance of the system when accessing the file. In another example, the file level IOPS for a file may include a recorded data transfer speed that is obtained when accessing the file. In another embodiment, the file level IOPS value may be measured using one or more hardware and/or software applications.

In addition, as shown in FIG. 4, method 400 may proceed with operation 406, where a predictive model is created for the storage volume, using metadata determined for the subset of the plurality of files and the IOPS values calculated for each of the subset of the plurality of files within the storage volume. In one embodiment, the metadata determined for the subset of the plurality of files may include metadata associated with each of the plurality of files within the storage volume. For example, for each of the plurality of files within the storage volume, metadata associated with that file may be identified. In another embodiment, the metadata may include data indicating one or more of a file extension of the file, an age of the file, an owner of the file, a size of the file, etc.

Furthermore, as shown in FIG. 4, method 400 may proceed with operation 408, where file level IOPS values are estimated for each of the plurality of files in the storage volume, utilizing the predictive model. In one embodiment, estimating the file level IOPS values for each of the plurality of files in the storage volume may include applying the predictive model to each of the files within the storage volume and utilizing the calculated file level IOPS values to determine a probability distribution of IOPS values for the plurality of files.

Further still, in one embodiment, estimating the file level IOPS values for each of the plurality of files in the storage volume may be performed utilizing one or more machine learning algorithms (e.g., one or more regression algorithms, etc.). In another embodiment, estimating the file level IOPS values for each of the plurality of files in the storage volume may include estimating a file level IOPS value for each file that does not have a file level IOPS value explicitly calculated for it. For example, file level IOPS values may be estimated for each of the plurality of files that are not include within the subset.

Also, in one embodiment, estimating the file level IOPS values for each of the plurality of files in the storage volume may include determining a probability distribution of IOPS values. For example, a distribution may be determined for the plurality of files, based on a comparison of the metadata for each of the files. In another embodiment, the probability distribution may be used to estimate IOPS values based on known metadata values for each file. For example, it may be determined that files having similar metadata may also have similar IOPS values, and IOPS values may be estimated for files with unknown IOPS values, utilizing IOPS values within the subset having similar metadata and calculated IOPS values.

Additionally, as shown in FIG. 4, method 400 may proceed with operation 410, where the estimated and calculated file level IOPS values are combined and compared to a calculated volume level IOPS value for the storage volume. In one embodiment, the volume level IOPS value may include an IOPS value explicitly calculated for the storage volume. For example, the volume level IOPS value may be measured for the entire storage volume using one or more hardware and/or software applications. In another embodiment, the IOPS values calculated for each of the subset of the plurality of files within the storage volume may be combined (e.g., summed, etc.) and may be combined with each of the IOPS values estimated for the remaining files within the storage volume (e.g., all files within the storage volume other than those in the subset). In this way, the estimated and calculated file level IOPS values may be combined to create an estimated volume level IOPS value for the storage volume, which may be compared to the actual calculated IOPS value for that storage volume.

Further, as shown in FIG. 4, method 400 may proceed with operation 412, where one or more of the estimated file level IOPS values are conditionally adjusted, based on the comparing. In one embodiment, one or more of the estimated file level IOPS values may be adjusted if the estimated volume level IOPS value for the storage volume is not equal to the actual calculated IOPS value for the storage volume (e.g., if the estimated volume level IOPS value for the storage volume is greater than or less than the actual calculated IOPS value for the storage volume, etc.). In another embodiment, when it is determined that the estimated volume level IOPS value for the storage volume is not equal to the actual calculated IOPS value for the storage volume, one or more of the estimated file level IOPS values may be adjusted so that the estimated volume level IOPS value for the storage volume equals the actual calculated IOPS value for the storage volume.

Further still, in one embodiment, adjusting one or more of the estimated file level IOPS values may include determining a probability distribution for each of the estimated file level IOPS values. In another embodiment, the probability distribution may include an exponential family (e.g., a Gaussian distribution, etc.). In yet another embodiment, adjusting one or more of the estimated file level IOPS values may include determining, for each estimated file level IOPS value, a variance associated with the probability distribution. For example, for each estimated file level IOPS value, the determined variance may indicate a level of uncertainty associated with the estimation of that file level IOPS value (e.g., a higher variance for an estimated value may indicate a greater level of uncertainty for the estimated value).

Also, in one embodiment, adjusting one or more of the estimated file level IOPS values may include adjusting one or more of the estimated file level IOPS values according to their associated variance. For example, each of the estimated file level IOPS values may be adjusted, where estimated file level IOPS values having a higher variance (and therefore a greater associated uncertainty) may be adjusted by a larger amount than file level IOPS having a lower variance (and therefore a lesser associated uncertainty).

Additionally, as shown in FIG. 4, method 400 may proceed with operation 414, where the estimated file level IOPS values are returned. In one embodiment, the estimated file level IOPS values that are returned may include the adjusted estimated file level IOPS values (e.g., when it was determined that the estimated volume level IOPS value for the storage volume is not equal to the actual calculated IOPS value for the storage volume). In another embodiment, the estimated file level IOPS values that are returned may include the estimated file level IOPS values that have not been adjusted (e.g., when it was determined that the estimated volume level IOPS value for the storage volume is equal to the actual calculated IOPS value for the storage volume).

For example, if it is initially determined that the estimated volume level IOPS value for the storage volume is not equal to the actual calculated IOPS value for the storage volume, each of the estimated file level IOPS values may be adjusted based on an associated variance, and the adjusted estimated file level IOPS values may be returned. In another embodiment, the estimated file level IOPS may be used to determine a readiness for a migration of the storage volume (e.g., to cloud storage, etc.) For example, the estimated file level IOPS may be returned to one or more applications managing a request to migrate the data within the storage volume. In this way, data that is accessed more frequently may be stored in a faster storage environment (e.g., within the cloud storage, etc.).

Figure 5:
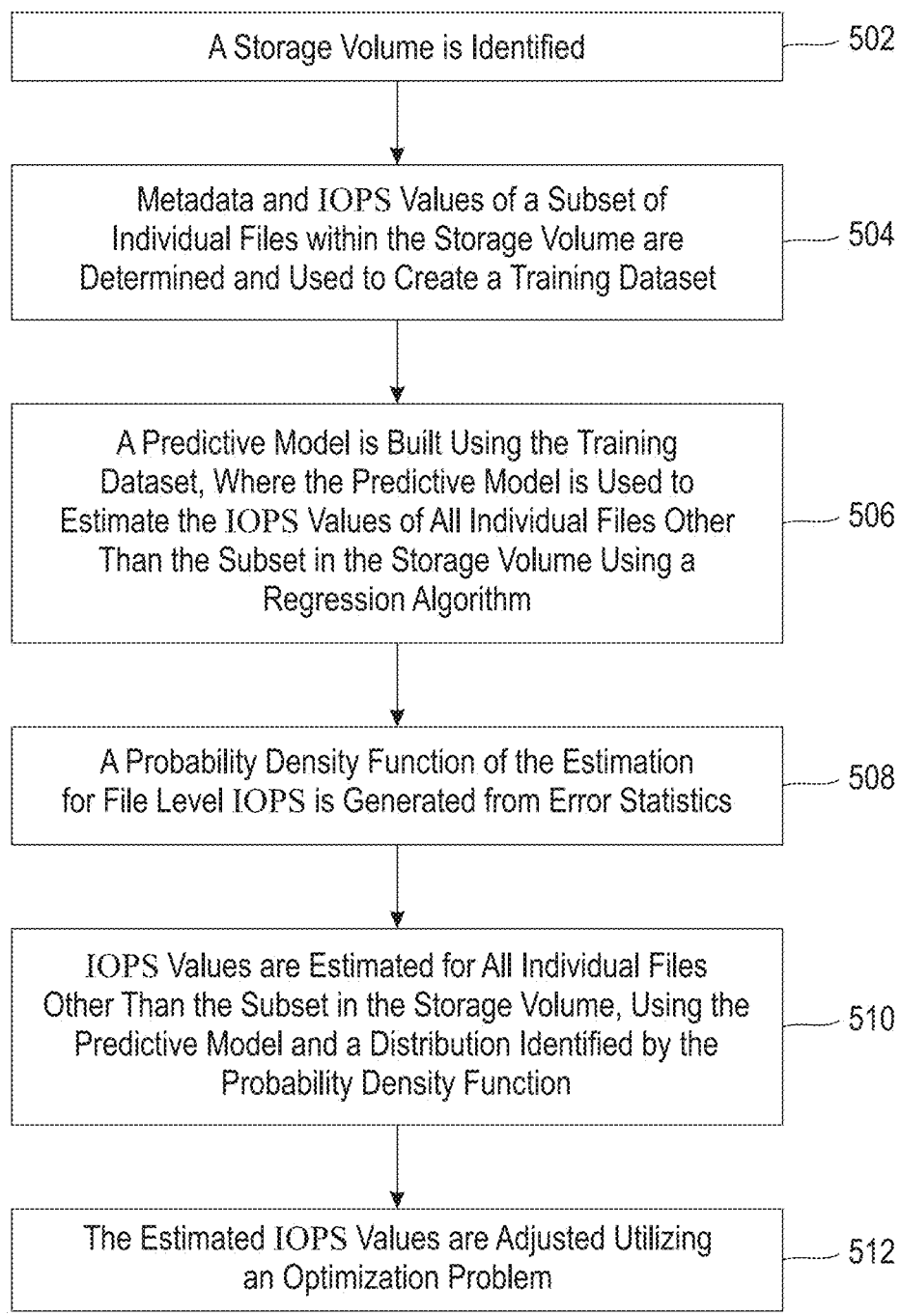
FIG. 5 illustrates a method for estimating IOPS values using a predictive model, in accordance with one embodiment.

Now referring to FIG. 5, a flowchart of a method 500 for estimating IOPS values using a predictive model is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a storage volume is identified. Additionally, method 500 may proceed with operation 504, where metadata and IOPS values of a subset of individual files within the storage volume are determined and used to create a training dataset. In one embodiment, each file in the storage volume may be represented using its metadata (e.g., extension, age, owner, size, etc.).

Further, method 500 may proceed with operation 506, where a predictive model is built using the training dataset, where the predictive model is used to estimate the IOPS values of all individual files other than the subset in the storage volume using a regression algorithm. In one embodiment, a model may be created to predict file level IOPS using a regression algorithm, and a probability distribution of the estimation may be created. In another embodiment, this may be achieved using machine learning (e.g., a regression algorithm, etc.). In another embodiment, error statistics may be calculated by analyzing an error between true and estimated IOPS values for files within the storage volume.

Further still, method 500 may proceed with operation 508, where a probability density function of the estimation for file level IOPS is generated from error statistics. In one embodiment, depending on the type of regression algorithms, there may be multiple probability density functions and thus different confidence levels on the estimated values.

Also, method 500 may proceed with operation 510, where IOPS values are estimated for all individual files other than the subset in the storage volume, using the predictive model and a distribution identified by the probability density function.

In addition, method 500 may proceed with operation 512, where the estimated IOPS values are adjusted utilizing an optimization problem. For example, the estimated IOPS values may be adjusted by solving the optimization problem. In one embodiment, the optimization problem may involve maximizing a likelihood of the estimated IOPS values while meeting the constraint that the sum of the estimated file level IOPS values must be equal to a calculated aggregated IOPS value for the storage volume.

In another embodiment, in order to satisfy the constraint of aggregation, the estimated IOPS values may be adjusted while maximizing the likelihood of final estimates based on the probability distribution of the estimation. In yet another embodiment, an uncertainty about the final estimates may be measured by an area under the probability distribution between the estimation and the adjusted final estimation. This step may be formulated with a quadratic optimization problem which may guarantee the practical implementation.

Table 1 illustrates an exemplary quadratic optimization problem used to adjust estimated IOPS values for files. Of course, it should be noted that the exemplary quadratic optimization problem shown in Table 1 is set forth for illustrative purposes only, and thus should not be construed as limiting in any manner.

TABLE 1

| maximize | $\Pi_{i=1}^{n} L(z^{(i)}) = \Sigma_{i=1}^{n} \log p(\hat{y}^{(i)} = z^{(i)} \mid x^{(i)}, \theta)$ |
|---|---|
| subject to | $\Sigma_{i=1}^{n} z^{(i)} = V_{IOPS}$ |
| | $0 \leq z^{(i)} \leq V_{IOPS}$, i = 1, . . . , n. |

In this way, file level IOPS values may be estimated for a volume when given only a calculation of volume level IOPS and metadata of all files within the storage volume in order to provide more precise and granular information for cloud migration.

Figure 6:
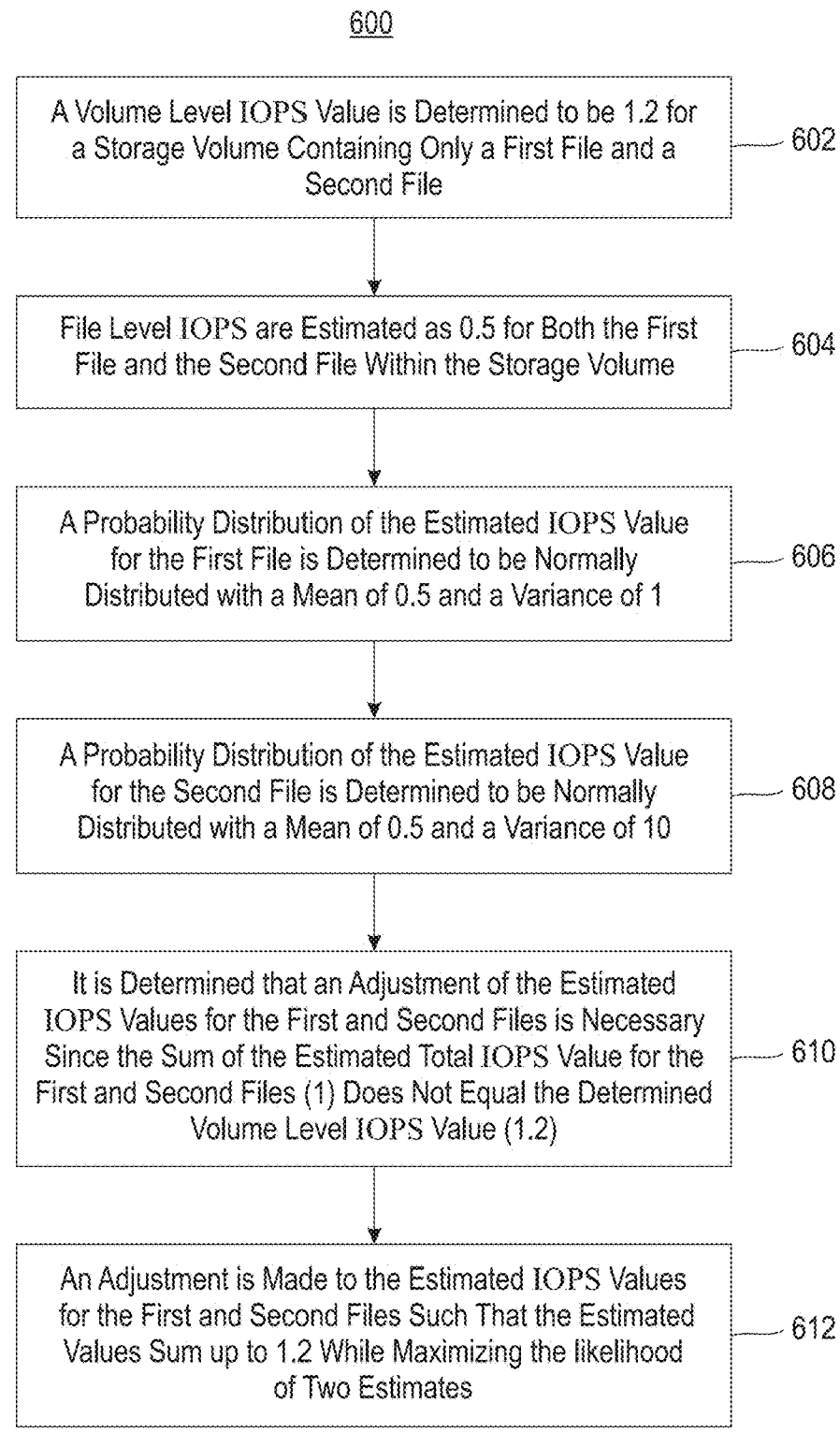
FIG. 6 illustrates a method for adjusting an estimated IOPS value, in accordance with one embodiment.

Now referring to FIG. 6, a flowchart of a method 600 for adjusting an estimated IOPS value is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a volume level IOPS value is determined to be 1.2 for a storage volume containing only a first file and a second file. Additionally, method 600 may proceed with operation 604, where file level IOPS are estimated as 0.5 for both the first file and the second file within the storage volume.

Further, method 600 may proceed with operation 606, where a probability distribution of the estimated IOPS value for the first file is determined to be normally distributed with a mean of 0.5 and a variance of 1. Further still, method 600 may proceed with operation 608, where a probability distribution of the estimated IOPS value for the second file is determined to be normally distributed with a mean of 0.5 and a variance of 10. In one embodiment, the predictive model may be more certain about the estimation of the IOPS value for the first file than the estimation of the IOPS value for the second file. For example, a higher variance associated with an estimated IOPS value may indicate a greater level of uncertainty associated with the estimated IOPS value.

Also, method 600 may proceed with operation 610, where it is determined that an adjustment of the estimated IOPS values for the first and second files is necessary since the sum of the estimated total IOPS value for the first and second files (1) does not equal the determined volume level IOPS value (1.2).

In addition, method 600 may proceed with operation 612, where an adjustment is made to the estimated IOPS values for the first and second files such that the estimated values sum up to 1.2 while maximizing the likelihood of two estimates. In one embodiment, the adjustment made to the estimated IOPS value for the first file may be less than the adjustment made to the estimated IOPS value for the second file, since the variance associated with the estimated IOPS value for the second file is greater than the variance associated with the estimated IOPS value for the first file. In this way, adjusting the value of the IOPS value for the second file may decrease the likelihood of the estimates less than adjusting the value of the IOPS value for the first file.

In one embodiment, the adjustment made to the estimated IOPS values for the first and second files may be performed by formulating and solving a quadratic optimization problem, which may be solved in polynomial time. For example, the optimization problem may be solved, and the estimated IOPS values for the first and second files may be changed to 0.518 and 0.682 respectively, which sum to 1.2, which equals the determined volume level IOPS value.

In this way, providing more relevant and detailed IOPS value information may support user decisions for one or more of private, public, and hybrid cloud migration. In another embodiment, incorporating file level IOPS measurements into one or more features used to determine benefits of a cloud migration may increase a flexibility of strategies provided to clients. In another embodiment, recovering the individual IOPS values from an aggregated value may be used for additional services such as profiling TV watching groups, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a storage volume comprising a plurality of files;
calculating a file level input/output operations per second (IOPS) value for each of a subset of the plurality of files within the storage volume;
creating a predictive model for the storage volume, using metadata determined for the subset of the plurality of files and the IOPS value calculated for each of the subset of the plurality of files within the storage volume;
estimating file level IOPS values for each of the plurality of files in the storage volume, utilizing the predictive model, where the predictive model implements machine learning via a regression algorithm to estimate the file level IOPS values for each of the plurality of files in the storage volume;
combining the estimated and calculated file level IOPS values to create a combined value, and comparing the combined value to a calculated volume level IOPS value for the storage volume;
conditionally adjusting one or more of the estimated file level IOPS values, based on the comparing; and
conditionally performing migration of the storage volume to a predetermined storage environment, based on the estimated file level IOPS values.

2. The computer-implemented method of claim 1, wherein the metadata determined for the subset of the plurality of files includes data indicating one or more of a file extension of a file, an age of a file, an owner of a file, a size of a file.

3. The computer-implemented method of claim 1, wherein estimating the file level IOPS values for each of the plurality of files in the storage volume includes applying the predictive model to each of the files within the storage volume and utilizing the calculated file level IOPS values to determine a probability distribution of IOPS values for the plurality of files.

4. The computer-implemented method of claim 1, wherein estimating the file level IOPS values for each of the plurality of files in the storage volume includes estimating a file level IOPS value for each of the plurality of files that are not included within the subset.

5. The computer-implemented method of claim 1, wherein estimating the file level IOPS values for each of the plurality of files in the storage volume includes determining a probability distribution of IOPS values.

6. The computer-implemented method of claim 1, wherein the calculated volume level IOPS value includes an IOPS value explicitly calculated for the storage volume.

7. The computer-implemented method of claim 1, wherein when it is determined that the combined value is not equal to the calculated volume level IOPS value for the storage volume, one or more of the estimated file level IOPS values are adjusted so that the combined value equals the calculated volume level IOPS value for the storage volume.

8. The computer-implemented method of claim 1, wherein adjusting one or more of the estimated file level IOPS values includes determining a probability distribution for each of the estimated file level IOPS values.

9. The computer-implemented method of claim 8, wherein the probability distribution includes an exponential family.

10. The computer-implemented method of claim 8, wherein one or more of the estimated file level IOPS values are adjusted by solving an optimization problem.

11. A computer program product for predicting future sales data, the computer program product comprising a computer readable storage medium having program instructions embodied therewith, wherein the computer readable storage medium is not a transitory signal per se, the program instructions executable by a processor to cause the processor to perform a method comprising:
    identifying, utilizing the processor, a storage volume comprising a plurality of files;
    calculating, utilizing the processor, a file level input/output operations per second (IOPS) value for each of a subset of the plurality of files within the storage volume;
    creating, utilizing the processor, a predictive model for the storage volume, using metadata determined for the subset of the plurality of files and the IOPS value calculated for each of the subset of the plurality of files within the storage volume;
    estimating, utilizing the processor, file level IOPS values for each of the plurality of files in the storage volume, utilizing the predictive model, where the predictive model implements machine learning via a regression algorithm to estimate the file level IOPS values for each of the plurality of files in the storage volume;
    combining, utilizing the processor, the estimated and calculated file level IOPS values to create a combined value, and comparing the combined value to a calculated volume level IOPS value for the storage volume;
    conditionally adjusting, utilizing the processor, one or more of the estimated file level IOPS values, based on the comparing; and
    conditionally performing, utilizing the processor, migration of the storage volume to a predetermined storage environment, based on the estimated file level IOPS values.

12. The computer program product of claim 11, wherein the metadata determined for the subset of the plurality of files includes data indicating one or more of a file extension of a file, an age of a file, an owner of a file, a size of a file.

13. The computer program product of claim 11, wherein estimating the file level IOPS values for each of the plurality of files in the storage volume includes applying the predictive model to each of the files within the storage volume and utilizing the calculated file level IOPS values to determine a probability distribution of IOPS values for the plurality of files.

14. The computer program product of claim 11, wherein estimating the file level IOPS values for each of the plurality of files in the storage volume includes estimating a file level IOPS value for each of the plurality of files that are not included within the subset.

15. The computer program product of claim 11, wherein estimating the file level IOPS values for each of the plurality of files in the storage volume includes determining a probability distribution of IOPS values.

16. The computer program product of claim 11, wherein the calculated volume level IOPS value includes an IOPS value explicitly calculated for the storage volume.

17. The computer program product of claim 11, wherein when it is determined that the combined value is not equal to the calculated volume level IOPS value for the storage volume, one or more of the estimated file level IOPS values are adjusted so that the combined value equals the calculated volume level IOPS value for the storage volume.

18. The computer program product of claim 11, wherein adjusting one or more of the estimated file level IOPS values includes determining a probability distribution for each of the estimated file level IOPS values.

19. The computer program product of claim 18, wherein the probability distribution includes an exponential family.

20. A system, comprising:
    a processor and logic integrated with and/or executable by the processor, the logic being configured to:
    identify a storage volume comprising a plurality of files;
    calculate a file level input/output operations per second (IOPS) value for each of a subset of the plurality of files within the storage volume;
    create a predictive model for the storage volume, using metadata determined for the subset of the plurality of files and the IOPS value calculated for each of the subset of the plurality of files within the storage volume;
    estimate file level IOPS values for each of the plurality of files in the storage volume, utilizing the predictive model, where the predictive model implements machine learning via a regression algorithm to estimate the file level IOPS values for each of the plurality of files in the storage volume;
    combine the estimated and calculated file level IOPS values to create a combined value, and compare the combined value to a calculated volume level IOPS value for the storage volume;
    conditionally adjust one or more of the estimated file level IOPS values, based on the comparison; and
    conditionally perform migration of the storage volume to a predetermined storage environment, based on the estimated file level IOPS values.

* * * * *